United States Patent
Beckman et al.

(10) Patent No.: US 10,246,186 B1
(45) Date of Patent: Apr. 2, 2019

(54) UNMANNED AERIAL VEHICLE WITH INFLATABLE MEMBRANE

(71) Applicant: Amazon Technologies, Inc., Seattle, WA (US)

(72) Inventors: Brian C. Beckman, Newcastle, WA (US); Noam Sorek, Zichron Yaccov (IL)

(73) Assignee: Amazon Technologies, Inc., Seattle, WA (US)

(*) Notice: Subject to any disclaimer, the term of this patent is extended or adjusted under 35 U.S.C. 154(b) by 282 days.

(21) Appl. No.: 15/065,767

(22) Filed: Mar. 9, 2016

(51) Int. Cl.
*B64C 39/02* (2006.01)
*B64B 1/62* (2006.01)
*B64C 27/08* (2006.01)

(52) U.S. Cl.
CPC ............. *B64C 39/024* (2013.01); *B64B 1/62* (2013.01); *B64C 27/08* (2013.01); *B64B 2201/00* (2013.01)

(58) Field of Classification Search
CPC . B64C 39/024; B64C 2201/108; B64C 27/08; B64C 2201/128; B64B 1/34; B64B 1/40; B64B 1/62; B64B 1/70; B64B 2201/00
See application file for complete search history.

(56) References Cited

U.S. PATENT DOCUMENTS

| | | | | |
|---|---|---|---|---|
| 3,558,083 A * | 1/1971 | Conley | ............. | B64B 1/40 244/33 |
| 3,801,044 A * | 4/1974 | Moore | ............. | B64B 1/00 244/125 |
| 3,856,238 A * | 12/1974 | Malvestuto, Jr. | ......... | B64B 1/00 244/25 |
| 4,889,297 A * | 12/1989 | Ikeda | ............. | B64C 37/02 244/25 |
| 5,026,003 A * | 6/1991 | Smith | ............. | B64B 1/02 244/127 |
| 6,167,263 A * | 12/2000 | Campbell | ............. | B64B 1/06 244/164 |
| 6,354,535 B1 * | 3/2002 | Perry | ............. | B64B 1/06 244/24 |
| 6,648,272 B1 * | 11/2003 | Kothmann | ............. | B64B 1/005 244/30 |
| 6,793,180 B2 * | 9/2004 | Nachbar | ............. | B64B 1/02 244/125 |
| 6,860,449 B1 * | 3/2005 | Chen | ............. | B64B 1/06 244/12.1 |
| 7,147,184 B1 * | 12/2006 | Purvis, IV | ............. | B64B 1/04 244/24 |
| 8,286,910 B2 * | 10/2012 | Alavi | ............. | B64B 1/60 244/30 |

(Continued)

*Primary Examiner* — Assres H Woldemaryam
(74) *Attorney, Agent, or Firm* — Athorus, PLLC

(57) ABSTRACT

This disclosure describes an unmanned aerial vehicle ("UAV") including an inflatable membrane (e.g., a balloon) and a compressed gas chamber containing a gas (e.g., helium, hydrogen, etc.) for inflating the membrane. When the UAV is approaching or departing from a location where noise reduction is desirable (e.g., a delivery location), the membrane may be inflated so as to increase the buoyancy of the UAV and allow the propulsion system (e.g., utilizing propellers, etc.) to be operated with less thrust and correspondingly with less noise. Once the UAV has departed and reached a certain distance from the location, the membrane may be deflated and retracted back into a storage area of the UAV.

21 Claims, 12 Drawing Sheets

(56) References Cited

U.S. PATENT DOCUMENTS

| | | | |
|---|---|---|---|
| 8,777,156 B2* | 7/2014 | Piini | B64B 1/62 244/94 |
| 2002/0179771 A1* | 12/2002 | Senepart | B64B 1/60 244/97 |
| 2005/0017129 A1* | 1/2005 | McDonnell | B64C 25/68 244/110 G |
| 2006/0000945 A1* | 1/2006 | Voss | B64B 1/60 244/97 |
| 2007/0069077 A1* | 3/2007 | Colting | B64B 1/30 244/128 |
| 2008/0087762 A1* | 4/2008 | Holloman | B64C 1/0009 244/30 |
| 2009/0114767 A1* | 5/2009 | Alavi | B64B 1/60 244/97 |
| 2009/0152391 A1* | 6/2009 | McWhirk | B64B 1/02 244/30 |
| 2013/0052014 A1* | 2/2013 | Kelly | F03D 5/00 416/66 |
| 2013/0119188 A1* | 5/2013 | Ciampa | B64B 1/62 244/30 |
| 2015/0217848 A1* | 8/2015 | Peyman | B64B 1/40 244/2 |
| 2015/0379876 A1* | 12/2015 | Navot | G08G 5/0021 701/301 |
| 2016/0257401 A1* | 9/2016 | Buchmueller | B64C 39/024 |
| 2016/0288894 A1* | 10/2016 | Sehnert | B64B 1/40 |

* cited by examiner

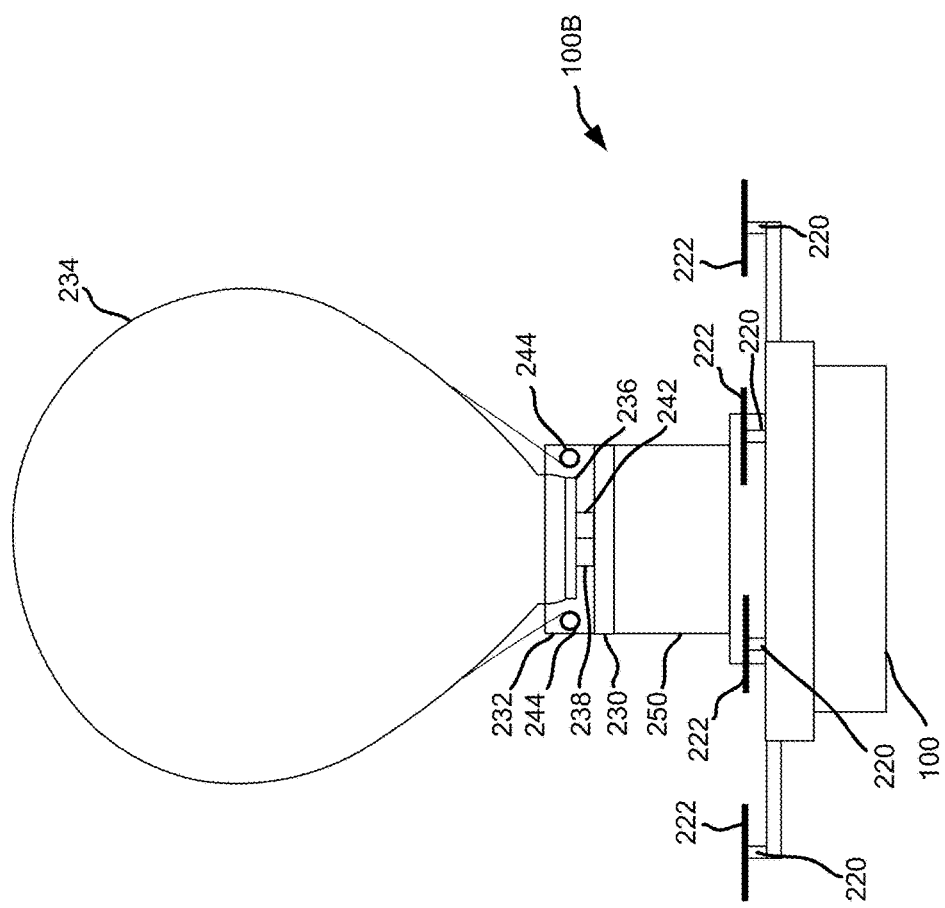

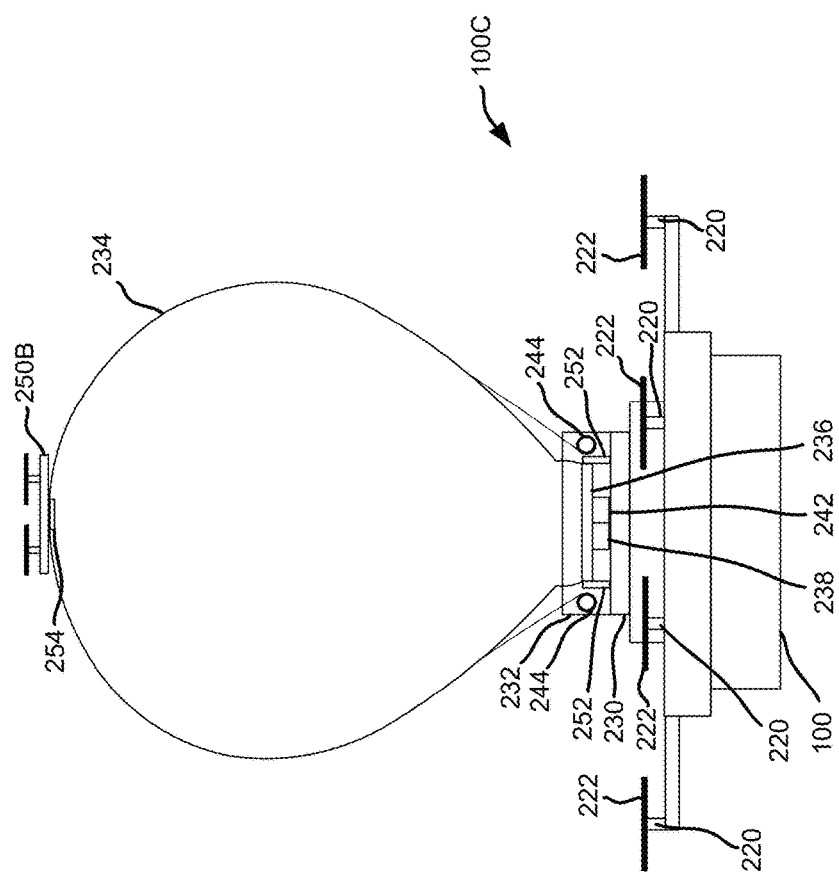

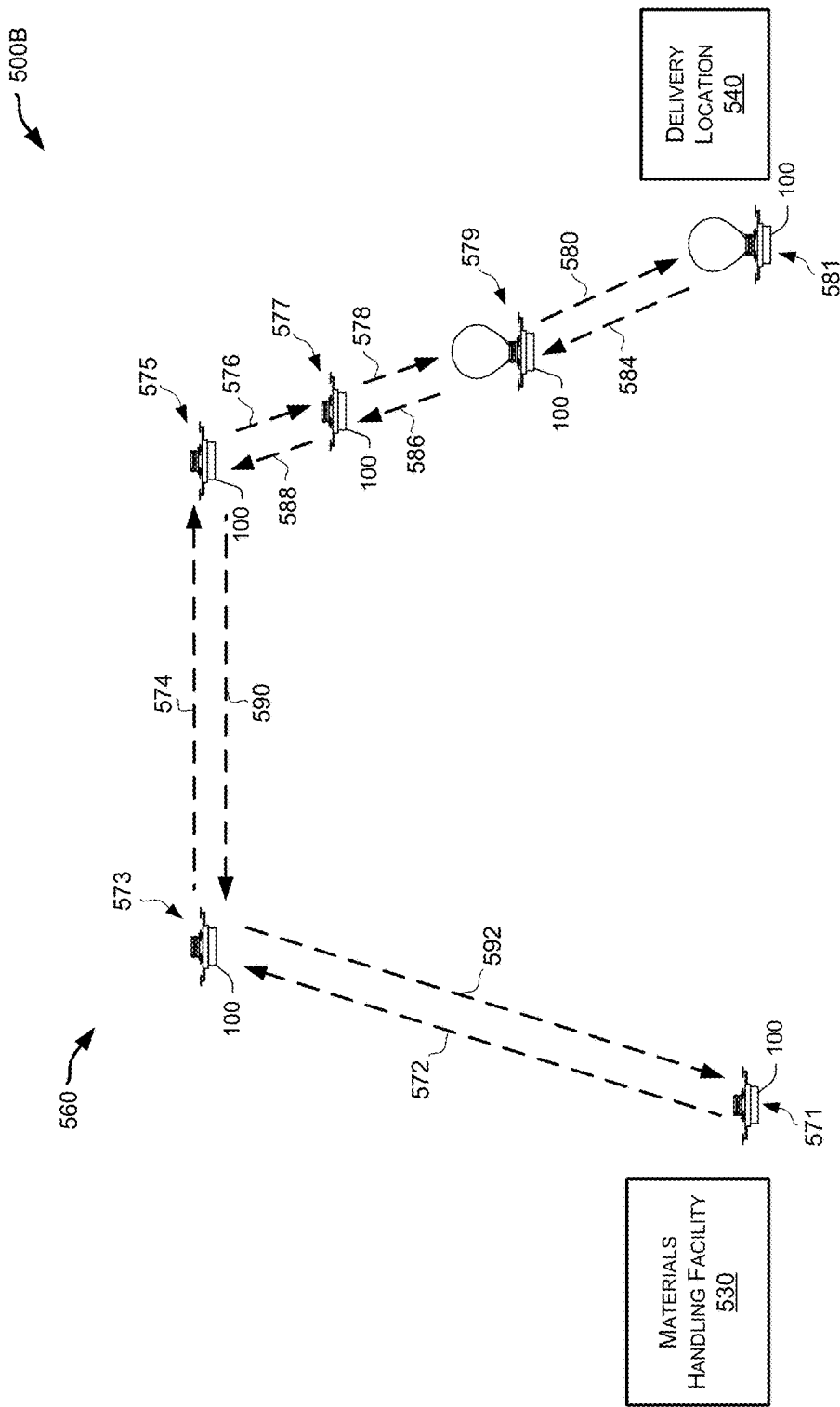

UNMANNED AERIAL VEHICLE WITH INFLATABLE MEMBRANE

BACKGROUND

Unmanned aerial vehicles are continuing to increase in use. For example, unmanned aerial vehicles are often used for surveillance. There is also discussion of electronic-commerce retailers, and other entities, delivering items directly to a user's home using unmanned aerial vehicles. While there are many beneficial uses of unmanned aerial vehicles, they also have many drawbacks. For example, relatively large and/or powerful motors may be utilized for certain types of unmanned aerial vehicles, which may produce relatively significant noise during operation. Such motors may be utilized for various reasons, such as enabling unmanned aerial vehicles to carry large amounts of weight (e.g., corresponding to numerous and/or large items to be transported, large batteries for long flight times, etc.). Due to the noise produced during operation, use of such unmanned aerial vehicles may be perceived as less than desirable in certain environments (e.g., residential neighborhoods).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A depicts another block diagram of a side view of an unmanned aerial vehicle, according to an implementation.

FIG. 3B depicts another block diagram of a side view of an unmanned aerial vehicle, according to an implementation.

FIGS. 5A and 5B depict diagrams of an unmanned aerial vehicle environment through which an unmanned aerial vehicle is able to travel, according to some implementations.

Figure 1A:
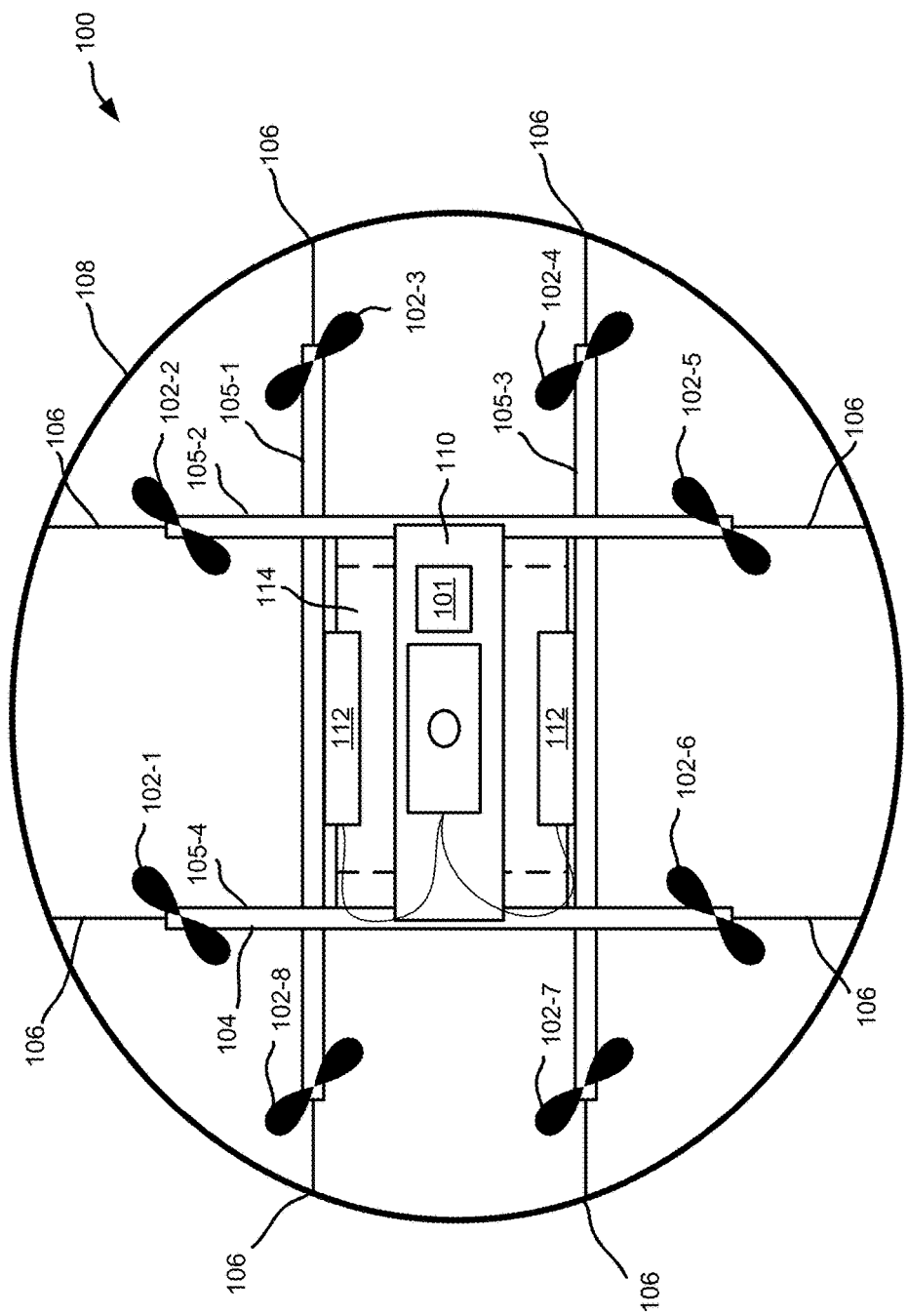
FIG. 1A depicts a block diagram of a top-down view of an unmanned aerial vehicle, according to an implementation.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes an unmanned aerial vehicle ("UAV") that includes an inflatable membrane (e.g., a balloon) that may be filled with gas from an on-board compressed gas chamber and utilized to reduce the required thrust and corresponding noise produced by the propulsion system of the UAV. In various implementations, an inflating mechanism (e.g., including a valve) may be utilized to control the flow of gas (e.g., helium, hydrogen, etc.) from the compressed gas chamber into the membrane. In various implementations, the UAV may include one or more inflatable membranes. For example, a single membrane (e.g., in the form of a balloon) may be attached to a central location of the frame of the UAV. Alternatively, the inflatable membrane may comprise a flexible bag that can be inflated with a gas (e.g., helium, hydrogen, nitrous oxide, and/or any type of gas that is lighter than air). In selected examples, the membrane may be fabricated from one or more of rubber, latex, polychloroprene, or a fabric (e.g., nylon) that retains the gas. As another example, multiple membranes may be attached at different locations on the UAV, such as multiple balloons attached to the top of the UAV, or elongated membranes that may be attached to the bottom or sides of the UAV (e.g., in the form of bladders, etc.). The locations where the inflatable membranes are attached are selected to be a sufficient distance from the propulsion system (e.g., the propellers) to prevent contact with the propulsion system.

In various implementations, a membrane may be inflated when a UAV is approaching or departing from a location where noise reduction is desirable. For example, a delivery location in a residential neighborhood may be one for which it is desirable to reduce the noise that is produced by the UAV. Once a UAV has departed and reached a certain distance from the location, the membrane may be deflated, retained, or released/discarded where it could be allowed to float away, biodegrade, or otherwise be disposed of in an environmentally responsible manner. In selected embodiments, the deployed membrane may provide sound reduction benefits to the UAV such that the material of the membrane assists in dampening the sound generated by the UAV propulsion mechanism. In various implementations, a deflating mechanism may be utilized for controlling the deflation of the membrane. For example, a compressor may be utilized for compressing the gas from the membrane back into the compressed gas chamber. As another example, a valve may be utilized to release the gas from the membrane into the air surrounding the UAV, provided the gas used is not hazardous to people, wildlife, or the environment.

In conjunction with the deflating of the membrane, a retraction mechanism may be utilized to retract the deflated membrane back into a storage area of the UAV. For example, the retraction mechanism may include rollers, a reel, etc. that are utilized to pull the material and/or supporting structures (e.g., tethers, cables, etc.) of the membrane back into the storage area. The retraction of the membrane may be controlled to ensure that the membrane does not come into contact with the propulsion system (e.g., propellers, etc.) as the membrane is being deflated.

In various implementations, the UAV may include a stabilization mechanism that maintains the membrane when it is inflated at a sufficient distance from the propulsion system (e.g., the propellers). In one implementation, the stabilization mechanism may include a tube-shaped structure with one end attached to the frame, wherein the membrane extends from the other end when inflated. For example, the membrane may be included in a configuration that is attached at the end of the tube-shaped structure, from which the membrane extends when inflated. As another example, the membrane may be located inside the tube-shaped structure when it is deflated, and then may extend out of the tube-shaped structure when it is inflated. As another example, the membrane may be located over the tube-shaped structure, wherein the membrane extends outward from the end of the tube-shaped structure when inflated, and when deflated the material of the membrane may be pulled down around the sides of the tube-shaped structure. In various implementations, the stabilization mechanism may be retractable or otherwise stowable when not in use, such as having one or more sections that are foldable, retractable, etc. In an alternative implementation, the stabilization mechanism may include a propulsion system for the membrane. For example, the stabilization mechanism may include one or more propulsion devices (e.g., propellers, etc.) that are attached to the membrane (e.g., at the top). The stabilization mechanism may be configured to pull the membrane upward to maintain the membrane at a sufficient distance away from the propulsion system of the UAV. For example, during inflation and/or deflation of the membrane, the stabilization mechanism may be utilized to maintain the material of the membrane in a taut state throughout the inflation/deflation process (e.g., to prevent any portion of the membrane from being able to come into contact with an element of the propulsion system of the UAV, such as a propeller).

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using a UAV.

FIG. 1A illustrates a block diagram of a top-down view of a UAV 100 with an inflatable membrane control system 101, according to an implementation. The inflatable membrane control system 101 is discussed in further detail below with respect to FIG. 1B. As illustrated in FIG. 1A, the UAV 100 has a propulsion system which includes eight propellers 102-1, 102-2, 102-3, 102-4, 102-5, 102-6, 102-7, 102-8 spaced about the frame 104 of the UAV. The propellers 102 may be any form of propeller (e.g., graphite, carbon fiber) and of a size sufficient to lift the UAV 100 and any inventory engaged by the UAV 100 so that the UAV 100 can navigate through the air, for example, to deliver an inventory item to a location. While this example includes eight propellers, in other implementations, more or fewer propellers may be utilized. Likewise, in some implementations, the propellers may be positioned at different locations on the UAV 100. In addition, alternative methods of propulsion may be utilized. For example, fans, jets, turbojets, turbo fans, jet engines, and the like may be used to propel the UAV.

The frame 104 or body of the UAV 100 may likewise be of any suitable material, such as graphite, carbon fiber and/or aluminum. In this example, the frame 104 of the UAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some implementations, all of the rigid members 105 may be of approximately the same length, while in other implementations, some or all of the rigid members may be of different lengths. Likewise, the spacing between the two sets of rigid members may be approximately the same or different and/or the orientation of the rigid members with respect to other rigid members and/or the frame 104 of the UAV may also vary.

While the implementation illustrated in FIG. 1A includes four rigid members 105 that are joined to form the frame 104, in other implementations, there may be fewer or more components to the frame 104. For example, rather than four rigid members, in other implementations, the frame 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. As discussed further below, a cavity within the frame 104 may be configured to include an inventory engagement mechanism for the engagement, transport and delivery of item(s) and/or containers that contain item(s).

In some implementations, the UAV may be configured for aerodynamics. For example, an aerodynamic housing may be included on the UAV that encloses the UAV control system 110, one or more of the rigid members 105, the frame 104 and/or other components of the UAV 100. The housing may be made of any suitable material(s), such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the UAV 100 so that no additional drag is created during transport of the inventory by the UAV 100. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 102 and corresponding propeller motors are positioned at both ends of each rigid member 105. For inventory transport purposes, the propeller motors may be any form of motor capable of generating enough speed with the propellers to lift the UAV 100 and any engaged inventory thereby enabling aerial transport of the inventory. For example, for these purposes, the propeller motors may each be a FX-4006-13 740 kv multi rotor motor. In some instances, the propeller motors may also be utilized for electricity generation procedures, for which they may be any form of motor (e.g., permanent magnet, brushless, etc.) capable of generating electricity when the propellers are turned by an airflow (e.g., from a wind or the relative movement of the UAV 100 through the air).

Extending outward from each rigid member is a support arm 106 that is connected to a safety barrier 108. In this example, the safety barrier is positioned around and attached to the UAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the UAV control system 110. In this example, the UAV control system 110 is mounted in the middle and on top of the frame 104. The UAV control system 110, as discussed in further detail below with respect to FIG. 7, controls the operation, routing, navigation, and communication of the UAV 100.

The UAV 100 also includes one or more power modules 112. In this example, the UAV 100 includes two power modules 112 that are removably mounted to the frame 104. The power module for the UAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power modules 112 are coupled to and provide power for the UAV control system 110 and the propeller motors.

In some implementations, one or more of the power modules may be configured such that it can be autonomously recharged, removed and/or replaced with another power module while the UAV is landed. For example, when the UAV lands at a delivery location, relay location and/or materials handling facility, the UAV may engage with a charging member at the location that will recharge the power module and/or the power module may be removed and replaced.

As mentioned above, the UAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the UAV control system 110. In implementations with additional rigid members, the UAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the inventory engagement mechanism may operate as the container, containing the inventory item(s) to be delivered. The inventory engagement mechanism communicates with (via wired or wireless communication) and is controlled by the UAV control system 110.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 1B:
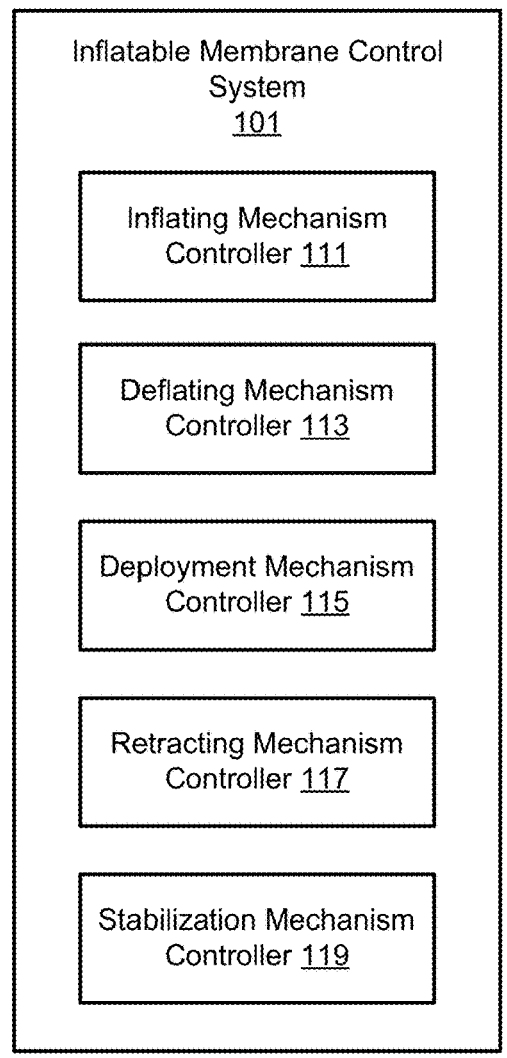
FIG. 1B depicts a block diagram of an inflatable membrane control system of an unmanned aerial vehicle, according to an implementation.

FIG. 1B provides additional details of the inflatable membrane control system 101, included in the UAV 100, according to an implementation. As will be described in more detail below with respect to FIG. 7, in various implementations the inflatable membrane control system 101 may be included as part of the UAV control system 110. As shown in FIG. 1B, the inflatable membrane control system 101 includes an inflating mechanism controller 111, a deflating mechanism controller 113, a deployment mechanism controller 115, a retracting mechanism controller 117 and a stabilization mechanism controller 119. It will be appreciated that in alternative implementations, more or fewer elements may be included in the inflatable membrane control system 101. For example, inflating mechanism controller 111 and deflating mechanism controller 113 may be combined into a single controller.

The inflating mechanism controller 111 is utilized for controlling the inflation of a membrane. In various implementations, the membrane may be configured to be inflated with a buoyant gas that is lighter than air (e.g., helium, hydrogen, etc.) from a compressed gas chamber, and the inflating mechanism controller 111 may control the transfer of the compressed buoyant gas from the compressed gas chamber to be expanded into the inflatable membrane. For example, an electronically controllable valve, pump, etc. may be activated and/or opened which allows and/or causes compressed buoyant gas from the compressed gas chamber to expand and flow into the inflatable membrane. As will be described in more detail below, in various implementations, the propulsion system of the UAV may include one or more propellers, and the inflation of the membrane with the buoyant gas that is lighter than ambient air (e.g., wherein the density of the expanded buoyant gas in the membrane is lower than a density of the ambient air) may increase the buoyancy of the UAV so as to reduce the required thrust and corresponding noise from the one or more propellers for flying along a portion of a travel path at a given speed.

The deflating mechanism controller 113 is utilized for controlling the deflation of the membrane. For example, a compressor may be utilized for compressing the gas from the membrane back into the compressed gas chamber. As another example, a valve may be controlled to release the gas from the membrane into the air surrounding the UAV. In various implementations, the deflating mechanisms and the inflating mechanisms of the UAV may include common components or devices (e.g., as part of a single compressor, pump, etc.) which are utilized for both inflating and deflating the membrane, in which case various portions or elements of the inflating mechanism controller 111 and the deflating mechanism controller 113 may be combined or otherwise part of the same controller.

The deployment mechanism controller 115 is utilized for controlling the deployment of the membrane from a storage area as part of an inflation process. For example, the membrane may be stored in a storage area of the UAV when it is not inflated, and the deployment mechanism controller 115 may control the unlocking and/or opening of an outer door or barrier of the storage area so that the membrane may be deployed. As another example, cables or other restraining devices may be released, unwound, etc. for allowing the membrane to be deployed as it is inflated.

The retracting mechanism controller 117 is utilized for controlling the retracting of the membrane as it is deflated. For example, one or more reels, rollers, etc. may be controlled for winding in a cable or other support mechanism and/or the material of the membrane itself for retracting the membrane into a storage area as the membrane is deflated. In various implementations, the retracting mechanisms and deployment mechanisms of the UAV may include common components or devices (e.g., reels, rollers, etc.) which may be operated in one direction for deploying the membrane and in an opposite direction for retracting the membranes. In such implementations, various portions or elements of the deployment mechanism controller 115 and retracting mechanism controller 117 may be combined or otherwise part of the same controller. In various implementations, the inflating mechanism controller 111 may operate in conjunction with the deployment mechanism controller 115 (e.g., for deploying the membrane as it is inflated), and the deflating mechanism controller 113 may operate in conjunction with the retracting mechanism controller 117 (e.g., for retracting the membrane as it is deflated). In varying implementations, the inflating and deflating of the membrane is controlled to prevent any slackened portions of the membrane from contacting or otherwise becoming entangled with the propulsion system of the UAV.

The stabilization mechanism controller 119 is utilized for controlling a stabilization mechanism that assists in maintaining the membrane at a sufficient distance from the propulsion system of the UAV, as will be described in more detail below with respect to FIGS. 3A and 3B. For example, the stabilization mechanism may include an extending structure that may be made of portions that are foldable, telescoping, etc., which can be extended or retracted in conjunction with the inflating or deflating of the membrane. In various implementations, an extending mechanism (e.g., a motor, etc.) may be controlled for extending or retracting, raising or lowering, etc. the stabilization mechanism. A locking mechanism may also be controlled for locking the stabilization mechanism into a respective position. As another example, the stabilization mechanism may include a propulsion system for the membrane, including one or more propulsion devices (e.g., propellers, etc.) that may be attached to the membrane (e.g., at the top) and which may be controlled for pulling the membrane upward. During inflation and/or deflation of the membrane, the stabilization mechanism may be controlled to maintain the material of the membrane in a taut state throughout the inflation/deflation process (e.g., to prevent any portion of the membrane from being able to come into contact with a propeller of the UAV).

Figure 2A:
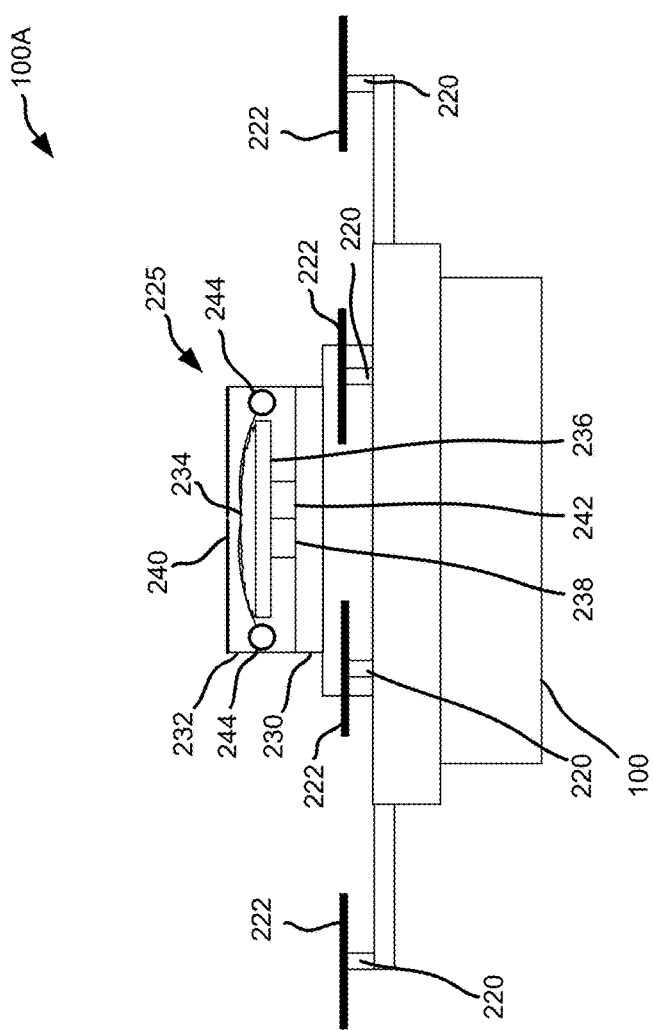
FIGS. 2A and 2B depict block diagrams of a side view of an unmanned aerial vehicle, according to an implementation.

FIG. 2A depicts a block diagram of a side view of a UAV 100A, according to an implementation. In the side view of the UAV illustrated in FIG. 2A, four motors 202 and propellers 204 are visible as part of a propulsion system. In other implementations, additional or fewer motors 202 and/or propellers 204 may be included as part of the propulsion system of the UAV 100. In this example, the motors 202 may all be mounted at 90 degrees with respect to the UAV 100. In an alternative implementation, the mountings of the motors may be adjustable and/or at different angles.

As shown in FIG. 2A, an inflatable membrane configuration 225 includes a compressed gas chamber 230 that is located beneath a storage area 232 where a membrane 234 is stored in a deflated state. In various implementations, the membrane may be made of a material (e.g., rubber, latex, polychloroprene, nylon fabric, etc.) which contains the gas and is relatively flexible and/or stretchable, etc. The storage area 232 is shown to include outer doors 240 that function as part of a deployment mechanism. For example, when the membrane 234 is to be inflated, the doors 240 and/or other barriers may be unlocked and/or opened to allow the membrane 234 to expand outward. The membrane 234 has a membrane base 236 that is coupled to the compressed gas chamber 230 by an inflating mechanism 238 and a deflating mechanism 242. The inflating mechanism 238 is configured to inflate the membrane 234 with gas from the compressed gas chamber 230. For example, the inflating mechanism 238 may include one or more devices (e.g., a valve, pump, etc.) that is activated and/or opened for allowing and/or causing gas from the compressed gas chamber 230 to flow into the membrane 234, as will be described in more detail below with respect to FIG. 2B.

Figure 2B:
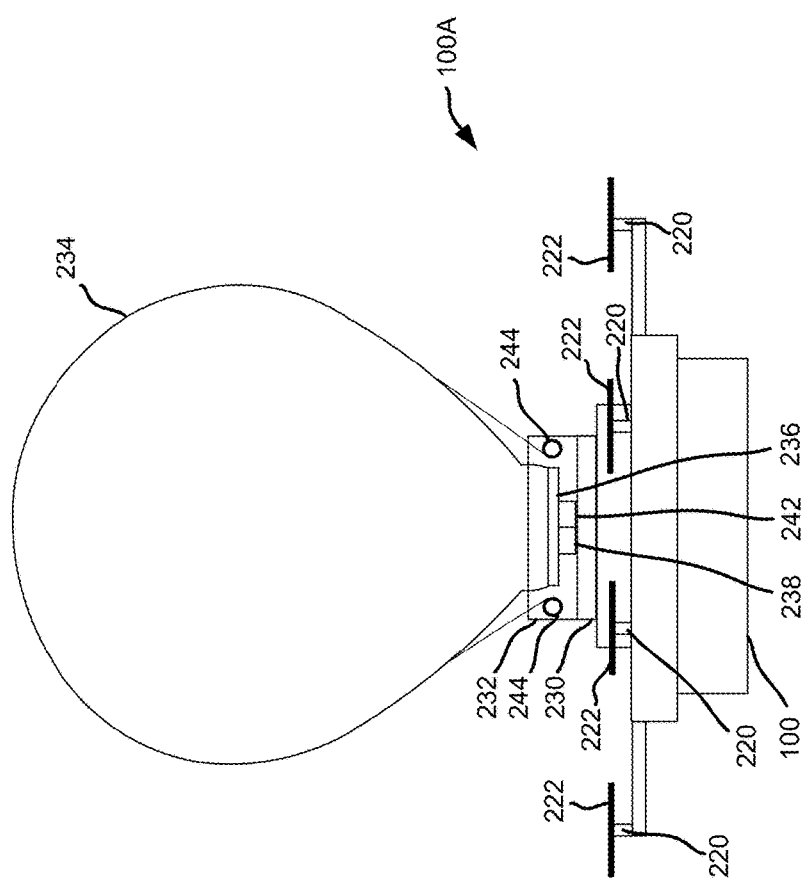

FIG. 2B illustrates the UAV 100A after the membrane 234 has been inflated. More specifically, in the illustration of FIG. 2B, the membrane 234 has been filled with gas that is lighter than air (e.g., helium, hydrogen, etc.) from the compressed gas chamber 230, and has expanded out of the storage area 232. In the inflated state, the membrane 234 counteracts some of the weight of the UAV, and due to the increased buoyancy from the inflated membrane, the propeller motors 220 may correspondingly be controlled to produce less thrust and noise than would otherwise be required without the inflated membrane. More specifically, for flying the UAV at a given average speed along a travel path (e.g., for descending to and/or ascending from a delivery location), the propeller motors 220 and propellers 222 may be operated with less thrust and correspondingly with less noise when the membrane 234 is inflated. It will be appreciated that in addition to potentially being utilized as part of a noise reduction procedure, the inflatable membrane may also provide other advantages. For example, the increased buoyancy provided by the inflated membrane that allows the propeller motors to operate with less thrust may also correspondingly result in energy savings with regard to the power required for operating the propeller motors, etc. Additionally, in circumstances where power to the propeller motors 220 may be lost, inflation of the membrane 234 may slow the rate of descent of the UAV 100A sufficiently to reduce an amount of damage that would otherwise result from UAV 100A falling from altitude. In such case, upper portion of membrane 234 may include an indication or marking that would make the downed UAV 100A more visible to a search/rescue craft overhead. Additionally, the membrane 234 may be further used as an indicator to the customer that a trusted UAV is approaching. In selected examples, a specific color may be used to indicate that a safe and trusted UAV (as opposed to a third-party, privacy invading UAV) is arriving. Alternatively still, each UAV may comprise a membrane of a different color, pattern, or shape, and the customer may be sent an indication (e.g., and email or SMS message) informing them which particular color, shape, and pattern of membrane can be used to identify their specific delivery.

When the membrane 234 is to be deflated (e.g., once the UAV has departed and traveled a sufficient distance from a delivery location, etc.), the deflating mechanism 242 (i.e., which is configured to deflate the membrane) may be utilized to remove the gas from the membrane 234. For example, the deflating mechanism 242 may include a compressor for compressing the gas from the membrane 234 back into the compressed gas chamber 230. As another example, the deflating mechanism 242 may include a valve (e.g., located beneath or on a side or top of the membrane 234) that is controlled (e.g., directly or remotely) for releasing the gas from the membrane 234 into the air surrounding the UAV.

As the membrane is deflated, retraction mechanisms 244 may be utilized to pull any slack portions of the membrane 234 into the storage area 232. In various implementations, it may be desirable for the membrane 234 to be deflated and retracted in a controlled manner (e.g., to avoid any possibility of entanglement or other contact of the membrane with the propellers 222). In various implementations, the retracting mechanisms 244 may include reels, rollers, etc. For example, rollers may include cables that either are attached to the membrane 234 or extend over the membrane 234 for assisting with the retraction of the membrane back into the storage area 232. In various implementations, the retraction mechanisms may also assist with the deflation process. For example, in a configuration where a valve is opened at the top of the membrane, a retraction mechanism (e.g., in the form of a wringer, etc.) may both wind in the material of the membrane and help squeeze the gas out of the other end of the membrane. In some instances, such retraction mechanisms may also assist with compressing the gas back into the compressed gas chamber through the force of the membrane being pulled into the storage area. It will be appreciated that such retraction mechanisms may also function as deployment mechanisms, wherein rotation in an opposite direction may allow the membrane to be deployed as it is being inflated. Once the membrane 234 has been fully deflated and retracted into the storage area 232, the outer doors 240 may be closed or otherwise secured over the storage area 232 (e.g., as illustrated in FIG. 2A).

In various implementations, the compressed gas chamber 230 may be removably mounted to the frame of the UAV. In some implementations, the compressed gas chamber 230 may be configured such that it can be autonomously refilled, removed and/or replaced with another compressed gas chamber 230 (e.g., while the UAV is landed). For example, when the UAV lands at a delivery location, relay location, materials handling facility, etc., the UAV may engage with a filling member at the location that will refill the compressed gas chamber and/or the compressed gas chamber may be removed and replaced.

FIG. 3A depicts another block diagram of a side view of a UAV 100B, according to an implementation. The UAV 100B of FIG. 3A is similar to the UAV 100A of FIG. 2A, except with the addition of a stabilization mechanism 250A (e.g., a tube-shaped extending structure). The stabilization mechanism is configured to maintain the inflated membrane 234 at a sufficient distance from the propellers 222 to avoid contact with the propellers 222 while the UAV is flying. In one implementation, the stabilization mechanism 250A may consist of a tube-shaped structure with a first end that is attached to the frame of the UAV 100B and a second end from which the membrane 234 extends when inflated. The stabilization mechanism 250A is coupled to the frame at a location that is a sufficient distance from the propeller motors 220 to maintain the membrane 234 away from the propellers 222). In the configuration of FIG. 3A, the membrane is included in a configuration that is attached at the end of the tube-shaped structure, from which the membrane extends when inflated. In an alternative configuration, the membrane may be located over the tube-shaped structure, wherein the membrane extends outward from the end of the tube-shaped structure when inflated, and when deflated the material of the membrane may be pulled down around the sides of the tube-shaped structure. In another alternative configuration, the membrane may be located inside the tube-shaped structure when it is deflated, and then may extend out of the tube-shaped structure when it is inflated. In such a configuration, the membrane may be connected by a tether, hose, etc. that is located within the tube-shaped structure and which connects to the frame or other support structure on the other end, and which may be wound in by a retracting mechanism when the membrane is deflated.

In various implementations, the stabilization mechanism 250A may be retractable or otherwise stowable when not in use (e.g., when the membrane 234 is not inflated). For example, the stabilization mechanism 250A may be made of portions that are foldable, telescoping, etc., which can be extended or retracted in conjunction with the inflating or deflating of the membrane 234. As another example, the stabilization mechanism 250A may be hinged at a location on the frame of the UAV 100B, wherein the stabilization mechanism may be folded down to one side when the membrane 234 is not inflated. In various implementations, an extending mechanism (e.g., a motor, etc.) may be controlled for extending and retracting, or raising and lowering, etc. the stabilization mechanism. A locking mechanism may also be controlled for locking the stabilization mechanism into a respective position.

FIG. 3B depicts another block diagram of a side view of an unmanned aerial vehicle 100C, according to an implementation. The UAV 100C of FIG. 3B is similar to the UAV 100A of FIG. 2A, except with the addition of a stabilization mechanism 250B (e.g., a propulsion system for the inflatable membrane). In one implementation, the stabilization mechanism 250B may include one or more propulsion devices (e.g., propellers, etc.) that are attached to the membrane 234 (e.g., at the top). The stabilization mechanism 250B is configured to pull the membrane upward so as to maintain the membrane at a sufficient distance away from the propellers 222 of the UAV 100C (e.g., so as to avoid contact with the propellers 222 while the UAV is flying). For example, during inflation and/or deflation of the membrane 234, the stabilization mechanism 250B may be utilized to maintain the material of the membrane in a taut state throughout the inflation/deflation process (e.g., so as avoid any portion of the membrane from being allowed to sag to one side and come into contact with a propeller 222, etc.)

The stabilization mechanism 250B may be powered by the power supply of the UAV 100C, or may include an independent power supply. In an implementation with an independent power supply, the membrane 234 may also in some instances be released from the UAV 100C (e.g., by a release mechanism 252) and allowed to independently fly (e.g., to a designated location such as back to a materials handling facility, to a location for collection, etc.). In this regard, the membrane propulsion system may have certain navigation and/or other capabilities (e.g., similar to certain capabilities of the UAV control system 110, as will be described in more detail below with respect to FIG. 7). In various implementations, the release mechanism 252 of the UAV 100C may be configured to release the membrane 234 from the UAV (e.g., at a designated location and/or time). In such configurations, the membrane base 236 may be configured (e.g., including one or more valves, etc.) to prevent gas from leaving the membrane once the membrane is released.

In various implementations, the release mechanism 252 may be configured to enable the membrane to be released even if the membrane does not include a stabilization mechanism 250B (e.g., wherein in such configurations the membrane 234 may be allowed to float away from the UAV when released). The membrane 234 may also include a tracking device 254 that is attached to the membrane to enable the location of the membrane to be tracked. For example, the tracking device 254 may be configured to provide a signal that enables a location of the membrane to be determined after the membrane is released from the UAV (e.g., so that an agent, UAV, other device, etc. may locate and retrieve the membrane, etc.).

Figure 4:
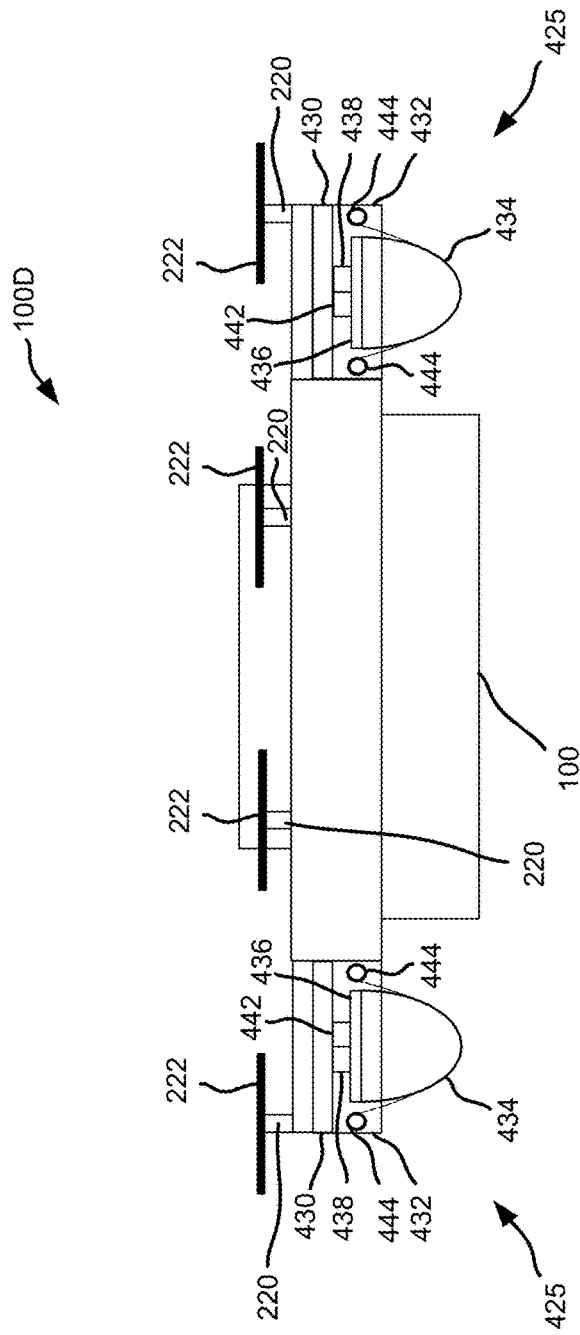
FIG. 4 depicts another block diagram of a side view of an unmanned aerial vehicle, according to an implementation.

FIG. 4 depicts another block diagram of a side view of a UAV 100D, according to an implementation. The UAV 100D of FIG. 4 is similar to the UAV 100A of FIG. 2A, except with a pair of inflatable membrane configurations 425 located underneath the sides of the UAV 100D. Each of the inflatable membrane configurations 425 have similar components and may operate similarly to the inflatable membrane configuration 225 of FIG. 2A. More specifically, each inflatable membrane configuration 425 is shown to include a compressed gas chamber 430, a storage area 432, an inflatable membrane 434, an inflatable membrane base 436, an inflating mechanism 438, a deflating mechanism 442 and retracting mechanisms 444. In the state illustrated in FIG. 4, the inflating mechanisms 438 have been utilized to transfer gas from the compressed gas chambers 430 to inflate the inflatable membranes 434. When the inflatable membranes 434 are to be retracted, the deflating mechanisms 442 may be utilized to remove the gas from the membranes 434 and the retracting mechanisms 444 may be utilized to retract the membranes 434 back into the storage areas 432. In one implementation, the inflatable membranes 434 may each consist of an elongated bladder that extends along the full length of each side of the UAV 100D, for which an end view of the inflatable membranes 434 is illustrated in FIG. 4. Alternatively, each of the inflatable membranes 434 may have a circular shape and additional inflatable membranes 434 may be included along the sides of the UAV 100D. It will be appreciated that the locations of the inflatable membranes 434 on the bottoms of the UAV 100D may in some instances result in the inflatable membranes 434 being less likely to come into contact with the propellers 222 during flight of the UAV 100D.

It will be appreciated that each of the configurations of the UAVs 100A, 100B, 100C, and 100D of FIGS. 2A-4 may have various advantages in certain applications. For example, the different configurations illustrated by the UAVs 100A, 100B, 100C and 100D may have different characteristics in terms of stability, air resistance, etc., which may each be desirable depending on the particular conditions and functions to be performed by the UAVs (e.g., carrying items for delivery, traveling through varying environments, traveling at different speeds, etc.). In various implementations, certain changes may also be made to each of the UAV configurations. For example, additional inflatable membranes may be included, which may be attached at different locations on the UAVs and/or which may be inflated at different times, etc. As another example, with respect to the configuration of the UAV 100C, a deflating mechanism may not be included, wherein the release mechanism may instead be utilized to allow an inflated membrane to be detached from the UAV (e.g., wherein the inflatable membrane may be retrievable or else made of a biodegradable material or otherwise may be safe to release into the environment at the given detachment location, etc.). As another example, in some instances where a membrane is made of certain types of expandable materials (e.g., rubber, latex, etc.), the membrane when deflated may shrink to a smaller size, for which smaller or no retraction mechanisms may be required (e.g., the membrane may shrink back into a storage area on its own and/or may be of a small enough size or deflated shape so as to not require storage, etc.). Alternatively still, the membrane may be configured as a first membrane inside of a second membrane. In one example, the first and second membranes may be constructed of a similar material, such that redundancy exists (e.g., if the first membrane ruptures, the second membrane can still be effective and vice versa). In another example, the second outer membrane may be constructed from a fabric (e.g., nylon, Kevlar, etc.) to house the first inner membrane. Such a second outer membrane could be constructed to improve the durability and damage resistance of the membrane system, or the outer second membrane may be constructed to shift or alter the buoyancy center of the inner first membrane so that the resulting lifting force may be shifted to accommodate a desired trajectory or loading condition on the UAV.

Figure 5A:
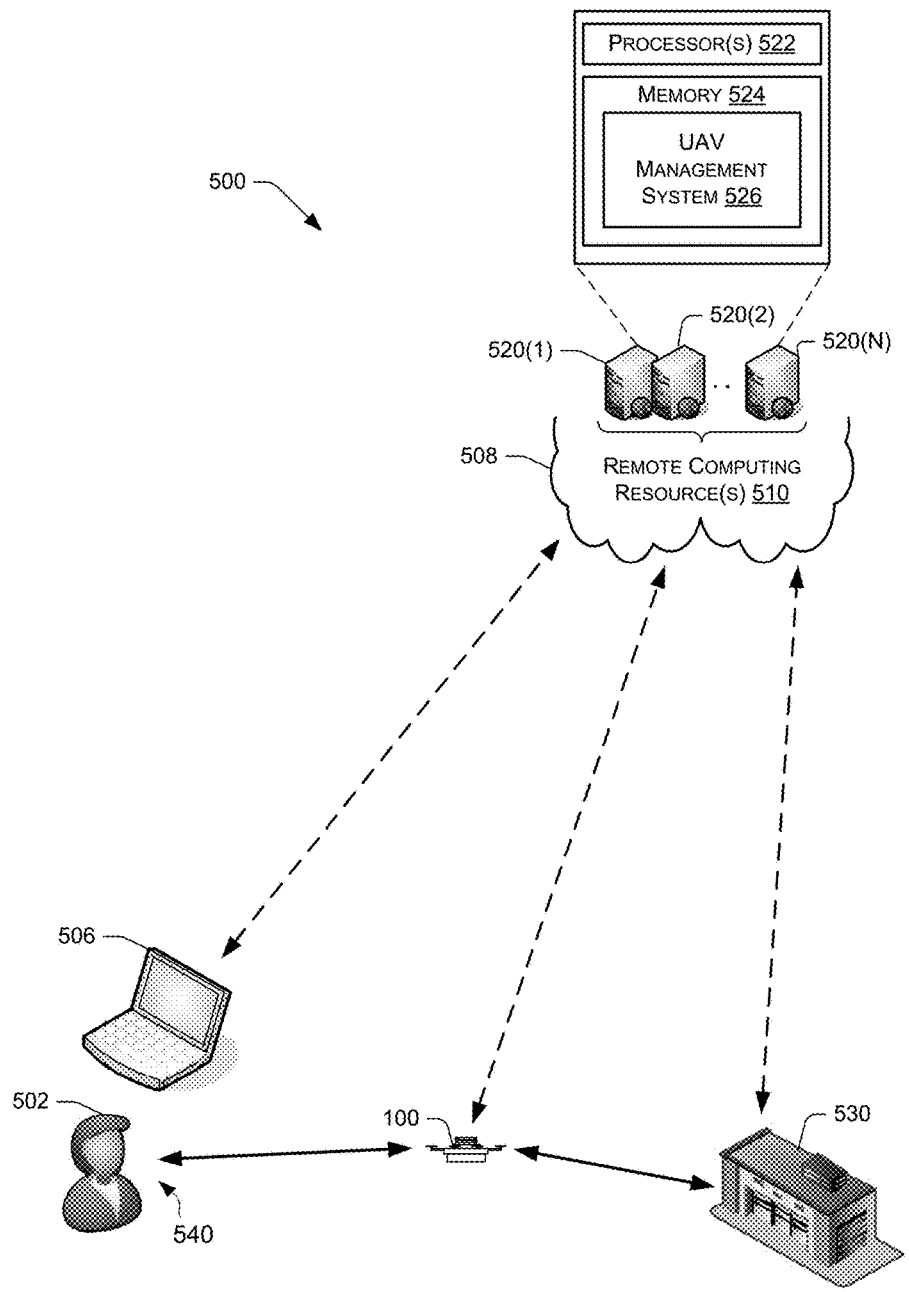

FIG. 5A is a block diagram of an illustrative UAV environment 500A that includes a user interface that allows a user 502 to place an order for one or more items. As will be described in more detail below, the ordered items may be transported by one or more UAVs 100 to a delivery location 540 (e.g., at a user's home, business, etc.). The user interface that allows the user 502 to place the order may be a graphical user interface, an audio only interface, a multi-mode interface, or any other interface for interacting with the user 502. The user interface may be provided to the user 502 through any type of electronic device 506, such as a tablet, desktop, laptop, smart phone, personal digital assistant, netbook, etc. The user interface may be delivered to the electronic device 506 by one or more remote computing resources 510 that make up part or all of an electronic commerce-shopping environment. In other embodiments, the user interface may include direct communication between a user and an agent.

The remote computing resources 510 may form a portion of a network-accessible computing platform implemented as a computing infrastructure of processors, storage, software, data access, and other components that is maintained and accessible via a network 508. Services, such as e-commerce shopping services, offered by the remote computing resources 510 do not require that the user have knowledge of the physical location and configuration of the system that delivers the services. The electronic device 506 may communicatively couple to the remote computing resources 510 via the network 508, which may represent wired technologies (e.g., wires, USB, fiber optic cable, etc.), wireless technologies (e.g., RF, cellular, satellite, Bluetooth, etc.), and/or other connection technologies. The network 508 carries data between the electronic device 506 and the remote computing resources 510.

After receiving from a user 502 an order for an item that may be transported by a UAV 100 from the materials-handling facility 530 to a delivery location 540, the electronic device 506 may send this information to the remote computing resources 510 over the network 508. As illustrated, the remote computing resources 510 may include one or more servers, such as servers 520(1), 520(2) . . . 220(N). These servers 520(1)-(N) may be arranged in any number of ways, such as server farms, stacks, and the like that are commonly used in data centers. Furthermore, the servers 520(1)-(N) may include one or more processors 522 and memory 524 that may store a UAV management system 526. The UAV management system 526 may be configured, for example, to perform order planning and filling of UAVs 100 with orders (e.g., at a materials handling facility 530) and/or scheduling of deliveries by UAVs 100 to user specified delivery locations.

The UAVs 100 may communicatively couple to the remote computing resources 510 via the network 508. For example, the communications to and from the UAVs 100 may utilize wireless antennas of the UAVs. Communications may be to and from control systems of the UAVs 100 (e.g., as described below with respect to FIG. 7). The UAVs 100, materials handling facility 530 and/or other network locations may also communicatively couple to each other.

The UAV management system 526 may also be configured, for example, to communicate with the UAVs 100 and/or network locations (e.g., the materials handling facility 530, etc.). In various implementations, the general activities of UAVs 100, including those related to the travel of the UAVs and the delivery and receiving of items by the UAVs, may be recorded, monitored, coordinated, and/or partially or otherwise controlled by the UAV management system 526. For example, the UAVs 100 and/or the UAV management system 526 may monitor and/or determine travel paths for transporting items. In various implementations, the UAV management system 526 may send instructions, needed information (e.g., regarding items, travel paths, etc.), and/or otherwise partially or completely control the UAVs 100 for delivering and/or receiving items, flying along travel paths, etc. As an example, information and/or instructions may be transmitted to a UAV 100 that indicates a travel path for transporting an item to a destination (e.g., a delivery location). As will be described in more detail below, the information and/or instructions may also indicate a portion or segment of a travel path where an inflatable membrane is to be inflated or deflated (e.g., as part of a sound modification procedure, etc.).

In various implementations, the remote computing resources 510 and/or UAV management system 526 may also receive tracking data (e.g., GPS) regarding the coordinates of the UAVs 100. The GPS data may be utilized for various purposes, such as answering location status requests, sending notifications regarding the current locations of the UAVs, etc. For example, a user may request that a notification be sent when a UAV 100 with an ordered item is approaching. As another example, notifications may be sent to UAVs 100 when they are approaching a delivery location, etc. Notifications may also be sent from UAVs 100 to the remote computing resources 510 and/or UAV management system 526 regarding various events (e.g., when a UAV has departed from a location, when a UAV has delivered an item, when a UAV is approaching a delivery location, etc.). As will be described in more detail below, the GPS data may also be utilized to determine when a UAV is approaching or at a segment or portion of a travel path where a membrane is to be inflated or deflated (e.g., as part of a noise modification procedure, etc.).

FIG. 5B is a diagram of a UAV environment 500B illustrating a travel path 560 along which a UAV 100 is flown from a materials handling facility 530 to a delivery location 540 and back to the materials handling facility 530. The travel path 560 begins at a location 571 (e.g., at or near the materials handling facility 530). The UAV 100 departs from the location 571 and is initially flown primarily in a vertical direction along an ascending segment 572 of the travel path to a location 573. The UAV is then flown in a direction that is primarily horizontal along a horizontal segment 574 to a location 575, from which the UAV 100 begins a descent by flying along a descending segment 576 to a location 577. In one implementation, the location 577 may be determined as a location where an inflating of a membrane is to be initiated (e.g., wherein the membrane has remained deflated during the portion of the travel path including the segments 572, 574 and 576). The membrane may be inflated as the UAV is flown along a descending segment 578, at the end of which the membrane may be fully inflated upon reaching a location 579. From the location 579, with the membrane inflated the UAV 100 is flown along a descending segment 580. The UAV 100 then reaches a location 581 (e.g., at or near the delivery location 540). In various implementations, the UAV 100 may deliver an item and/or perform other functions at the location 581 (e.g., retrieving a returned item from a user, etc.).

In certain instances, rather than inflating the membrane along a descending segment of the travel path, the membrane may be inflated at the delivery location 540 after the UAV has delivered the item. For example, in an implementation where the departure of the UAV involves propulsion operations that are noisier than the landing operations (e.g., due to the greater thrust required by the propellers for ascending as compared to descending), the inflating of the membrane may be performed once the UAV is preparing to depart from the location 581.

Regardless of whether the membrane is inflated during descending segments or at the location 581, the membrane remains inflated for the portion of the travel path during which the UAV is flown along the ascending segment 584 back to the location 579. At the location 579, a deflation process is initiated, wherein the membrane is deflated while the UAV is flown along an ascending segment 586. At the location 577, the membrane has been fully deflated and retracted into a storage area of the UAV 100. The UAV is then flown along an ascending segment 588 to the location 575, after which the UAV is flown in a direction that is primarily horizontal along a horizontal segment 590, during which the membrane remains deflated. It will be appreciated that the deflating and storing of the membrane may allow the UAV to be flown faster and in a more controlled manner along the horizontal segment 590. More specifically, if the membrane had remained inflated, the increased surface area of the inflated membrane may have added additional air resistance to the travel of the UAV as well as making the UAV more susceptible to forces from high winds, etc. In this regard, the deflating of the membrane prior to traveling along a segment (e.g., substantially horizontal segment 590) may generally result in the UAV being more aerodynamic and allow the UAV to be flown at a relatively faster speed and with greater control. The deflating and storing of the membrane may also reduce concerns regarding relative airflows pushing the inflated membrane toward one or more of the propellers of the UAV 100 as the UAV is flown at faster speeds. After the UAV has completed the segment 590 and reached the location 573, the UAV 100 is flown along a descending segment 592 back to the location 571 (e.g., at or near the materials handling facility 530).

It will be appreciated that the amount of gas utilized to inflate the membrane may be adjusted (e.g., utilizing the inflating and/or deflating mechanisms) in order to control the lifting power (e.g., the buoyancy) provided by the inflated membrane at a given point along the travel path. For example, when a UAV is transporting an item (e.g., from the materials handling facility 530 to the delivery location 540), the weight of the item may be a factor in determining a desired amount of buoyancy of the inflated membrane. In various implementations, the amount of gas utilized to inflate the membrane may be increased when the UAV is carrying a heavier item, to counteract the additional weight. For example, when a UAV is transporting a five-pound item, it may be desirable to fill the membrane with more gas to have more buoyancy than when the UAV is transporting a two-pound item.

In various implementations, the amount of buoyancy of the membrane may also be a factor with regard to acquiring or releasing an item while the propulsion system of the UAV is still being operated. For example, when the propulsion system of the UAV is continuously operated during an acquisition or release of an item (e.g., when thrust continues to be provided while the UAV just touches down or remains hovering just above or at a surface where an item is to be acquired or released), the amount of thrust required from the propellers of the UAV (e.g., to maintain or achieve a given altitude) may be significantly different before and after the item (e.g., a five-pound item) is acquired or released. In various implementations, careful control of the propulsion system may be required in such instances in order to avoid having the UAV suddenly and/or unexpectedly move in an undesirable manner after the item is acquired or released. The amount of buoyancy of the inflated membrane may be controlled (e.g., through utilization of the inflation and/or deflation mechanisms) in combination with controlling the propulsion system (e.g., the propellers) during such maneuvers. As one example, if the membrane has been inflated for transporting a five-pound item, at a time when the item is to be released it may in some instances be desirable to partially deflate the membrane and/or prepare to adjust the propulsion system (e.g., the propellers) in regard to the desired movement of the UAV after the item is released.

It is noted that if the UAV inadvertently becomes tilted during an acquisition or release maneuver (e.g., due to an uneven distribution of weight before, during, or after the acquisition or release of the item), the buoyancy of the inflated membrane may help stabilize the movement of the UAV. For example, if the UAV is unexpectedly tilted, the thrust provided from the propellers may inadvertently be directed in a partially horizontal direction (e.g., potentially resulting in unexpected and undesirable horizontal movement of the UAV). In contrast, it is noted that the buoyancy of the inflated membrane will produce lifting forces in the upward direction (i.e., vertically), regardless of whether the UAV is tilted. As a result, by utilizing the buoyancy of the inflated membrane to reduce the amount of thrust required from the propulsion system (e.g., the propellers) during an acquisition or release maneuver, less control of the propulsion system may be required and the UAV may more reliably be controlled to move in an upward direction following the acquisition or release of the item.

Figure 6:
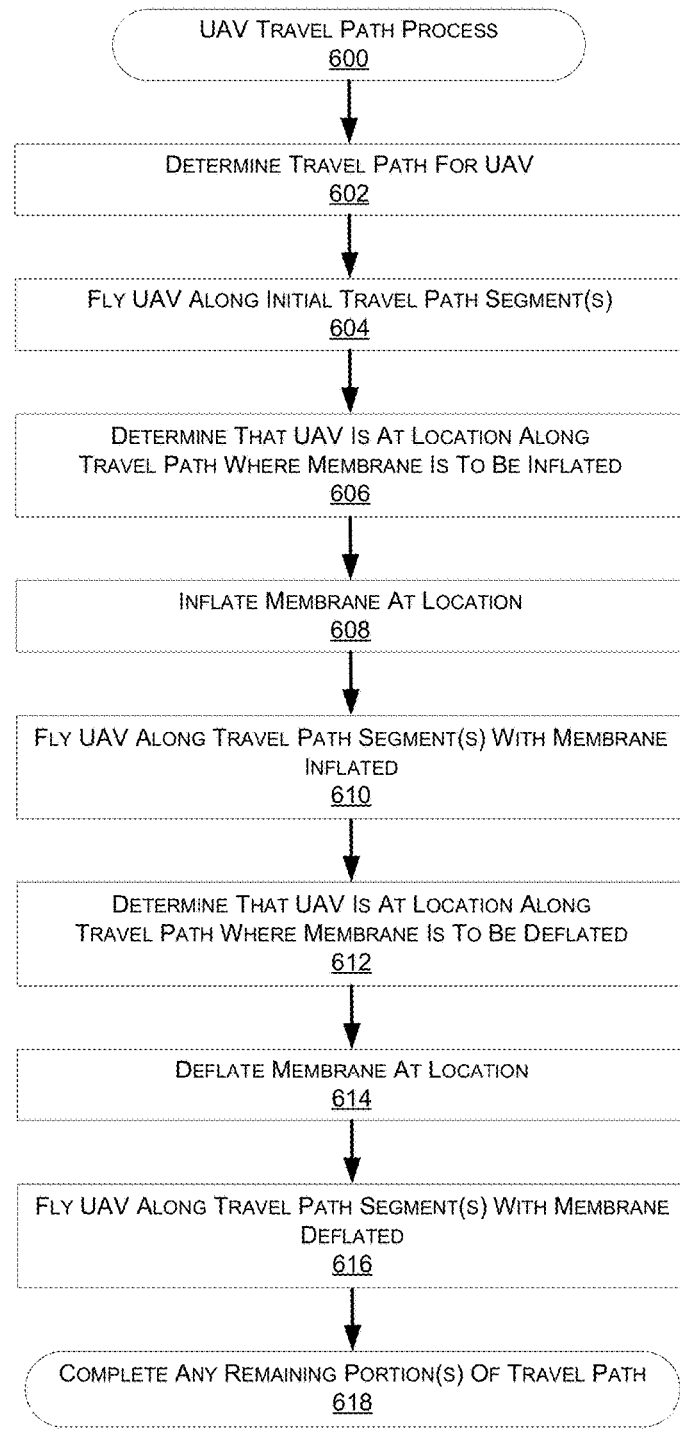
FIG. 6 is a flow diagram illustrating an example unmanned aerial vehicle travel process, according to an implementation.

FIG. 6 is a flow diagram illustrating an example process 600 for a UAV traveling along a travel path, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins with a determination of a travel path for the UAV, as in 602. In various implementations, the starting point for the travel path (e.g., a current location of the UAV) may be associated with a materials handling facility, a delivery location after a delivery has been completed, a retrieval location for retrieving a returned item from a user, etc. As part of the navigation for the travel path, the UAV may follow a designated route, and may also have capabilities for sensing and reacting to any dynamic events that may occur (e.g., avoiding any obstacles such as other UAVs, structures, etc.). In various implementations, the determination of the travel path may include receiving instructions and/or information related to the travel path from a remote computing resource (e.g., a UAV management system 526). Such instructions and/or information may include indications of a starting and/or ending location of a travel path, and may further include more detailed instructions (e.g., indicating locations or segments of the travel path where a membrane is to be inflated and/or deflated, etc.). In various implementations, the UAV may also function autonomously for determining part or all of the travel path.

After the travel path is determined, the UAV is flown along any initial travel path segments, as in 604. For example, as part of a delivery process, the UAV may initially be flown from a materials handling facility to a location where the UAV will begin a descent toward a delivery location. As the UAV is flown along the travel path, a determination is made as to when the UAV has reached a location where a membrane will be inflated, as in 606. In various implementations, such a determination may be made according to a sensed distance to a delivery location (e.g., as sensed by the sensors of the UAV and/or remote computing resources), or according to GPS coordinates or other location determining methods and/or techniques. In various implementations, a location where the membrane is to be inflated may be predetermined and received along with the travel path instructions, or may otherwise be determined before or while the UAV is travelling along the travel path.

In various implementations, the inflating of the membrane may be performed as part of a noise modification procedure, for which the determination of where the membrane will be inflated may be based at least in part on current conditions. For example, data regarding the current amount of weight being carried by the UAV, the expected thrust required at takeoff and landing, current temperatures, current weather conditions, etc. may affect that relative level of noise produced by the UAV, how well the UAV may be controlled while the membrane is inflated, etc. In various implementations, data regarding such conditions (e.g., as received from remote computing resources, determined by sensors of the UAV or other sources, etc.) may be utilized as part of a noise modification procedure for determining locations where the membrane will be inflated and/or deflated and for selecting an operating speed (e.g., RPM of the motor) relative to the increased buoyancy provided by the inflated membrane.

As one example, high winds that are detected may adversely affect the controllability of the flight of the UAV once the membrane is inflated. When such conditions are detected, it may be desirable to reduce the amount of time or distance that the UAV is to travel with the membrane inflated (e.g., for which locations that are closer to a delivery location and/or further from the high winds may be determined for both the inflating and deflating of the membrane). In various implementations, if high winds or other unfavorable conditions are detected, a determination may also be made that the membrane should not be inflated at all (e.g., as a safety concern with regard to the controllability of the flight of the UAV, etc.). In addition, if such conditions are unexpectedly encountered during a flight where the membrane has already been inflated (e.g., if winds shift or become stronger during a flight, etc.), a determination may be made that the membrane should be quickly deflated or released from the UAV.

As another example of a detected condition, a human may be determined to be at or near a location (e.g., a delivery location) which may increase the desirability for performing the noise modification and/or starting and/or ending the noise modification further from the location (e.g., so as to improve the experience of a user who is having an item delivered by the UAV). In various implementations, a human detection process may utilize any applicable type of sensors (e.g., visual, infrared, thermal imaging, range sensing, etc.) along with appropriate processing software to determine if an object is human. For example, if thermal imaging is used, a heat signature generated by the presence of a human may be detected and a determination made that a human (or other living organism) is present. As another example, known dimensions and structures (e.g., near or at a delivery location) may be compared to current measurements and/or images to evaluate whether a detected object and/or movements are determined to be human, for determining if and where a membrane should be inflated as part of a noise modification procedure. In addition, as part of an ordering process, a user may be given an option to a request that the UAV that delivers the item be one that has noise modification capabilities (e.g., including an inflatable membrane) and/or that such noise modification capabilities be utilized and/or that they be utilized earlier in the delivery process so as to further reduce the noise that is experienced at the delivery location. For example, a user may make such a request if noise modification is particularly preferable at a particular time of day when a delivery is to be made (e.g., if someone will be sleeping in the household at the time of the delivery, etc.)

Once the UAV has reached the location that has been determined for the inflation of the membrane, the membrane is inflated, as in 608. Following the inflation of the membrane, the UAV continues to fly along the travel path segments (e.g., including horizontal, descending or ascending segments) while the membrane remains inflated, as in 610. For example, as described above, after completing a delivery, the UAV may depart from the delivery location and may fly along an ascending segment of the travel path with the membrane inflated to reduce the required thrust and corresponding noise produced by the propeller motors.

After the UAV has been flown along the segments of the travel path with the membrane inflated, a determination is made of when the UAV has reached a location along the travel path where the membrane is to be deflated, as in 612. For example, as described above, once the UAV has departed and reached a certain distance where sound modification may no longer be needed, the membrane may be deflated and retracted back into a storage area of the UAV. The determination of the location where the membrane will be deflated may be based on similar factors (e.g., current conditions, etc.) as described above with respect to determining a location where a membrane will be inflated.

Once the UAV has reached the location that has been determined for the deflation of the membrane, the membrane is deflated, as in 614. Once the membrane is deflated, the UAV is flown along subsequent travel path segments with the membrane deflated, as in 616. For example, as described above, the UAV may be able to fly faster and with more control (e.g., along a substantially horizontal segment of the travel path for returning to a materials handling facility) without the encumbrance of the inflated membrane, which may add additional air resistance (e.g., which may slow the travel of the UAV and/or may make the UAV more difficult to control at higher speeds). Once the UAV has flown along the subsequent travel path segments with the membrane deflated, any remaining portions of the travel path are completed, as in 618. In various implementations, the UAV may be configured so that the membrane may be inflated and deflated more than once along a travel path (e.g., inflated at both a materials handling facility and a delivery location, etc.), such that the process steps related to the inflating and deflating of the membrane may be repeated. For example, the compressed gas chamber may be provided with enough gas for multiple inflations and/or the compressed gas chamber may be refilled or swapped out at a landing location along a travel path and/or a compressor may be utilized to compress the gas from the membrane back into the compressed gas chamber, etc.

Figure 7:
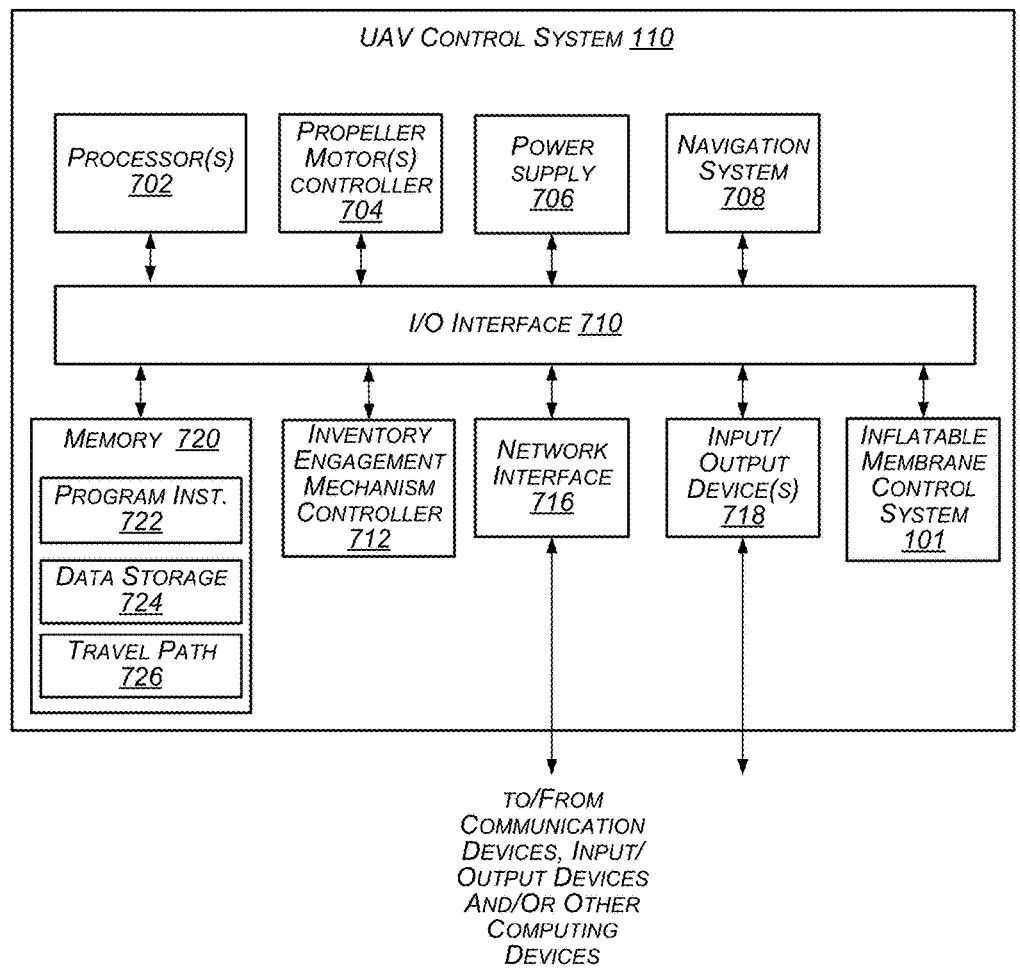
FIG. 7 is a block diagram illustrating various components of an unmanned aerial vehicle control system, according to an implementation.

FIG. 7 is a block diagram illustrating an example UAV control system 110 of a UAV 100. In various examples, the block diagram may be illustrative of one or more aspects of the UAV control system 110 that may be used to implement the various systems and methods discussed above. In the illustrated implementation, the UAV control system 110 includes one or more processors 702, coupled to a non-transitory computer readable storage medium 720 via an input/output (I/O) interface 710. The UAV control system 110 may also include a propeller motor controller 704, power supply module 706 and/or a navigation system 708. The UAV control system 110 further includes an inventory engagement mechanism controller 712, a network interface 716, and one or more input/output devices 718. The UAV control system may also include an inflatable membrane control system 101, as described above with respect to FIG. 1B.

In various implementations, the UAV control system 110 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, travel paths, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724 and travel path data 726, respectively. In other implementations, program instructions, data and/or travel paths may be received, sent or stored upon different types of computer-accessible media, such as non-transitory media, or on similar media separate from the non-transitory computer readable storage medium 720 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Additionally, in some implementations, some or all of the functionality of the I/O interface 710, such as an interface to the non-transitory computer readable storage medium 720, may be incorporated directly into the processor(s) 702.

The propeller motor(s) controller 704 communicates with the navigation system 708 and adjusts the power of each propeller motor to fly the UAV along a determined travel path. The navigation system 708 may include a GPS or other similar system than can be used to navigate the UAV to and/or from a location. As described above, in various implementations, the UAV may be flown at various times utilizing noise modification procedures, which may include inflating a membrane (e.g., as controlled by the inflatable membrane control system 101) and correspondingly reducing the power that would otherwise be required for each propeller motor.

The power supply module 706 may control the charging and any switching functions associated with one or more power modules (e.g., batteries) of the UAV. The inventory engagement mechanism controller 712 communicates with the motor(s) (e.g., a servomotor) used to engage and/or disengage inventory. For example, when the UAV is positioned over a level surface at a delivery location, the inventory engagement mechanism controller 712 may provide an instruction to a motor that controls the inventory engagement mechanism to release the inventory.

The network interface 716 may be configured to allow data to be exchanged between the UAV control system 110 and other devices attached to a network, such as other computer systems, and/or with UAV control systems of other UAVs. For example, the network interface 716 may enable wireless communication between numerous UAVs. In various implementations, the network interface 716 may support communication via wireless general data networks, such as a Wi-Fi network. For example, the network interface 716 may support communication via telecommunications networks such as cellular communication networks, satellite networks, and the like.

Input/output devices 718 may, in some implementations, include one or more displays, image capture devices, thermal sensors, infrared sensors, time of flight sensors, accelerometers, pressure sensors, airflow sensors, speed sensors, vibration sensors, noise sensors, weight sensors, temperature sensors, etc. For example, such sensors may be utilized for measuring certain aspects during a noise modification procedure (e.g., when a membrane is inflated), such as sound, speed, weight, temperature, etc. Such aspects may be utilized for determining when the membrane is to be inflated and/or deflated, the speed of the motors during the noise modification procedure, etc. Multiple such input/output devices 718 may be present and controlled by the UAV control system 130. Certain sensors may also be utilized to assist with navigation, landings, avoiding obstacles during flight, etc.

As shown in FIG. 7, the memory may include program instructions 722 that may be configured to implement the example processes and/or sub-processes described above. The data storage 724 may include various data stores for maintaining data items that may be provided for determining travel paths, retrieving inventory, landing, identifying a level surface for disengaging inventory, executing a noise modification procedure, inflating and/or deflating a membrane, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 110 may also be connected to other devices that are not illustrated, or instead may operate as a standalone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 110 may be transmitted to the UAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Figure 8:
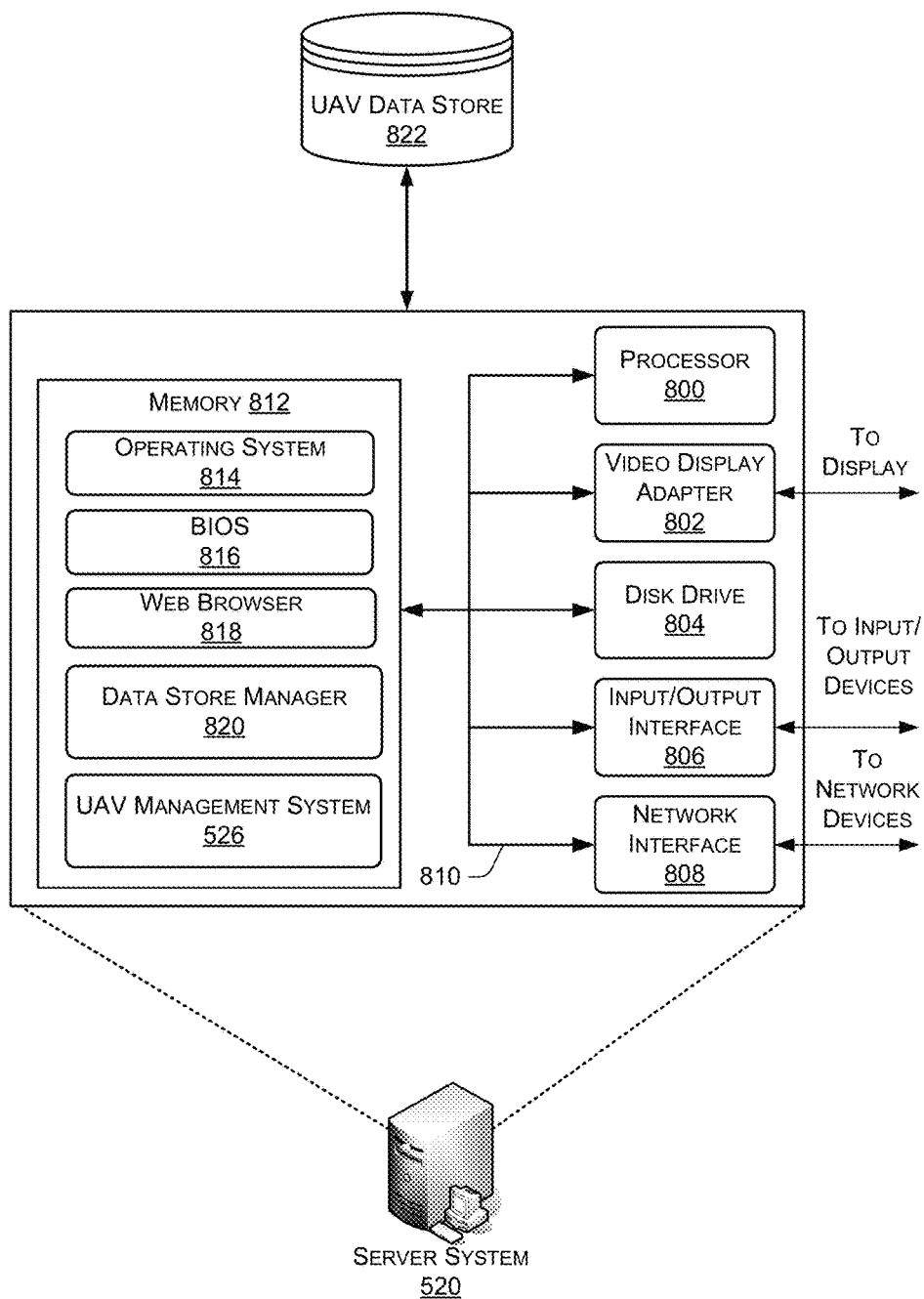
FIG. 8 is a block diagram of an illustrative implementation of a server system that may be used with various implementations.

FIG. 8 is a pictorial diagram of an illustrative implementation of a server system, such as the server system 520 that may be used in the implementations described herein. The server system 520 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 520 to monitor and configure operation of the server system 520. The input/output interface 806 likewise communicates with external input/output devices not shown in FIG. 8, such as a mouse, keyboard, scanner, or other input and output devices that can be operated by an operator of the server system 520. The network interface 808 includes hardware, software, or any combination thereof, to communicate with other computing devices. For example, the network interface 808 may be configured to provide communications between the server system 520 and other computing devices, such as a UAV, other electronic device, materials handling facility, and/or a delivery location, as shown in FIGS. 5A and 5B.

The memory 812 generally comprises random access memory (RAM), read-only memory (ROM), flash memory, and/or other volatile or permanent memory. The memory 812 is shown storing an operating system 814 for controlling the operation of the server system 520. A binary input/output system (BIOS) 816 for controlling the low-level operation of the server system 520 is also stored in the memory 812.

The memory 812 additionally stores program code and data for providing network services to the UAV management system 526. Accordingly, the memory 812 may store a browser application 818. The browser application 818 comprises computer executable instructions that, when executed by the processor 800, generate or otherwise obtain configurable markup documents such as Web pages. The browser application 818 communicates with a data store manager application 820 to facilitate data exchange between the UAV data store 822 and other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 520 can include any appropriate hardware and software for integrating with the UAV data store 822 as needed to execute aspects of one or more applications for the UAV management system, UAVs, materials handling facilities, delivery locations, etc.

The data store 822 can include several separate data tables, databases or other data storage mechanisms and media for storing data relating to a particular aspect. For example, the data store 822 illustrated includes UAV information, weather information, wind speeds and directions, travel path information, source location information, destination location information, etc., which can be used to generate and deliver information to the UAV management system 526, materials handling facilities, delivery locations, UAVs, and/or users. It should be understood that there may be many other aspects that may be stored in the UAV data store 822. The data stores 822 are operable, through logic associated therewith, to receive instructions from the server system 520 and obtain, update or otherwise process data in response thereto.

The memory 812 may also include the UAV management system 526, discussed above. The UAV management system 526 may be executable by the processor 800 to implement one or more of the functions of the server system 520. In one implementation, the UAV management system 526 may represent instructions embodied in one or more software programs stored in the memory 812. In another implementation, the UAV management system 526 can represent hardware, software instructions, or a combination thereof.

The server system 520, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method to operate an unmanned aerial vehicle (UAV), the method comprising:
   determining a travel path for a UAV related to a delivery of an item, the travel path including a delivery location where the UAV delivers the item;
   flying the UAV along the travel path, wherein the flying of the UAV includes controlling vertical takeoff propellers of the UAV to lift the UAV;
   inflating a membrane that is maintained by a stabilization mechanism at a sufficient distance from the vertical takeoff propellers of the UAV to avoid contact with the propellers while the UAV is flying, the inflating of the membrane resulting in an increase in a buoyancy of the UAV, wherein the membrane remains inflated during at least an ascending segment of the travel path during which the UAV is flown to ascend from the delivery location after delivering the item; and
   deflating the membrane, wherein the membrane remains deflated during at least a horizontal segment of the travel path during which the UAV is flown in a direction that is substantially horizontal.

2. The method of claim 1, wherein due to the increased buoyancy from the inflated membrane, the vertical takeoff propellers are controlled to produce less thrust and correspondingly less noise than would otherwise be required for flying the UAV along the at least ascending segment of the travel path.

3. The method of claim 1, wherein the UAV is flown at a first average speed along the at least ascending segment of the travel path and is flown at a second average speed along the horizontal segment of the travel path, and the second average speed is faster than the first average speed.

4. The method of claim 1, wherein the inflating of the membrane is performed along the travel path at a location that is at least one of:
   prior to the UAV arriving at the delivery location to deliver the item; or
   at the delivery location after the UAV has delivered the item.

5. The method of claim 1, further including detecting a current condition related to the delivery of the item by the UAV, wherein based at least in part on the detected current condition a determination is made of a location along the travel path where the inflating of the membrane is performed.

6. The method of claim 5, wherein the current condition is related to at least one of weather, wind or a presence of a human near the delivery location.

7. An unmanned aerial vehicle (UAV) comprising: a propulsion system comprising a first vertical takeoff propeller that is configured to lift the UAV;
   a compressed gas chamber configured to contain a gas that is lighter than air;
   an inflatable membrane configured to be inflated with gas from the compressed gas chamber;
   a stabilization mechanism that maintains the membrane at a sufficient distance from the first vertical takeoff propeller to avoid contact with the first vertical takeoff propeller while the UAV is flying; and
   a computing system comprising:
   one or more processors; and
   a memory coupled to the one or more processors and storing program instructions that when executed by the one or more processors cause the one or more processors to at least:
   inflate the membrane with gas from the compressed gas chamber;
   fly the UAV along an at least ascending segment of a travel path with the membrane inflated;
   deflate the membrane; and
   fly the UAV along a subsequent segment of the travel path with the membrane deflated.

8. The UAV of claim 7, wherein the gas from the compressed gas chamber comprises at least one of helium or hydrogen.

9. The UAV of claim 7, further comprising a storage area where the membrane is stored when it is not inflated.

10. The UAV of claim 9, further comprising a retracting mechanism that retracts the membrane into the storage area.

11. The UAV of claim 10, wherein the retracting mechanism includes at least one of a reel or a roller.

12. The UAV of claim 7, wherein the stabilization mechanism includes at least one of:
   an extending structure with a first end that is coupled to a frame of the UAV at a first location and a second end from which the membrane extends when inflated; or
   a membrane propulsion system coupled to the membrane and configured to pull at least a portion of the membrane away from the first vertical takeoff propeller.

13. An unmanned aerial vehicle (UAV) comprising:
   a propulsion system comprising one or more vertical takeoff propellers that are configured to lift the UAV;
   an inflatable membrane;
   a compressed buoyant gas;
   an inflating mechanism configured to inflate the membrane through expansion of the compressed buoyant gas; and
   a stabilization mechanism that maintains the membrane at a sufficient distance from the one or more vertical takeoff propellers to avoid contact with the one or more vertical takeoff propellers while the UAV is flying;
   wherein a density of an expanded buoyant gas in the membrane is lower than a density of ambient air,
   wherein the membrane remains inflated during at least an ascending portion of a travel path of the UAV; and
   wherein the membrane remains deflated during at least a second portion of the travel path of the UAV.

14. The UAV of claim 13, wherein the inflating mechanism comprises a valve that is opened to allow the compressed buoyant gas to flow into the membrane from a compressed gas chamber.

15. The UAV of claim 13, wherein the membrane comprises at least one of rubber, latex, polychloroprene, or a nylon fabric.

16. The UAV of claim 13, wherein the membrane is in the form of at least one of a balloon or a bladder.

17. The UAV of claim 13, wherein the inflation of the membrane increases a buoyancy of the UAV so as to reduce a required thrust and corresponding noise from the one or more vertical takeoff propellers for flying the UAV along the ascending portion of the travel path at a first speed.

18. The UAV of claim 13, wherein the UAV further comprises a deflating mechanism configured to deflate the membrane, the deflating mechanism including at least one of:
- a compressor that compresses the expanded buoyant gas from the membrane back into a compressed gas chamber; or
- a valve that releases the gas from the membrane to flow into the ambient air surrounding the UAV.

19. The UAV of claim 13, further comprising a release mechanism configured to release the membrane from the UAV.

20. The UAV of claim 19, further comprising at least one of:
- a membrane propulsion system coupled to the membrane and configured to transport the membrane after the membrane is released from the UAV; or
- a tracking device coupled to the membrane and configured to provide a signal that enables a location of the membrane to be determined after the membrane is released from the UAV.

21. The UAV of claim 13, wherein the stabilization mechanism includes at least one of:
- an extending structure with a first end that is coupled to a frame of the UAV at a first location and a second end from which the membrane extends when inflated; or
- a membrane propulsion system coupled to the membrane and configured to pull at least a portion of the membrane away from the one or more vertical takeoff propellers.

* * * * *